(12) United States Patent
Droux et al.

(10) Patent No.: US 7,591,011 B1
(45) Date of Patent: Sep. 15, 2009

(54) ASSIGNING HIGHER PRIORITY TO TRANSACTIONS BASED ON SUBSCRIPTION LEVEL

(75) Inventors: Nicolas G. Droux, San Jose, CA (US); Sunay Tripathi, San Jose, CA (US); Eric T. Cheng, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 833 days.

(21) Appl. No.: 11/112,947

(22) Filed: Apr. 22, 2005

(51) Int. Cl.
*G06F 9/00* (2006.01)
*G06F 15/16* (2006.01)
*G06F 17/00* (2006.01)

(52) U.S. Cl. ........................ 726/13; 380/200
(58) Field of Classification Search ................ 370/322, 370/397, 251, 408; 709/202; 455/452; 719/310; 726/13; 380/200; 326/8
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,363,411 B1 * | 3/2002 | Dugan et al. | 709/202 |
| 6,477,643 B1 | 11/2002 | Vorbach et al. | |
| 6,600,721 B2 | 7/2003 | Edholm | |
| 6,628,629 B1 * | 9/2003 | Jorgensen | 370/322 |
| 6,714,960 B1 | 3/2004 | Bitar et al. | |
| 6,757,731 B1 | 6/2004 | Barnes et al. | |
| 6,829,217 B1 | 12/2004 | Bechtolsheim et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,146,431 B2 | 12/2006 | Hipp et al. | |
| 7,177,311 B1 | 2/2007 | Hussain et al. | |
| 7,257,815 B2 | 8/2007 | Gbadegesin et al. | |
| 7,260,102 B2 | 8/2007 | Mehrvar et al. | |
| 7,313,142 B2 | 12/2007 | Matsuo et al. | |
| 7,417,999 B1 * | 8/2008 | Charny et al. | 370/408 |
| 2002/0052972 A1 | 5/2002 | Yim | |
| 2003/0037154 A1 | 2/2003 | Poggio et al. | |
| 2005/0135243 A1 | 6/2005 | Lee et al. | |
| 2005/0138620 A1 | 6/2005 | Lewites | |
| 2005/0172156 A1 * | 8/2005 | Gbadegesin et al. | 713/201 |

(Continued)

OTHER PUBLICATIONS

Pino Persiano; A secure and private system for subscription-based remote services; Year of Publication: 2003; TISSEC; vol. 6, Issue 4; pp. 472-500.*

(Continued)

*Primary Examiner*—Kambiz Zand
*Assistant Examiner*—Monjour Rahim
(74) *Attorney, Agent, or Firm*—Osha • Liang LLP (57) ABSTRACT

A computing system is configured to receive incoming packets at a first priority designated for use when receiving packets that are not associated with specific subscription levels. Incoming packets are examined to determine whether they are associated with a particular subscription level. Responsive to a determination that a given packet received over a particular connection is associated with a particular subscription level, the computing system is reconfigured to process packets subsequently received over the same connection at a different priority associated with the particular subscription level.

20 Claims, 4 Drawing Sheets

U.S. PATENT DOCUMENTS

2005/0250509 A1* 11/2005 Choksi .................... 455/452.1
2005/0251808 A1* 11/2005 Gbadegesin et al. ........ 719/310
2006/0041667 A1 2/2006 Ahn et al.
2006/0070066 A1 3/2006 Grobman
2006/0174324 A1 8/2006 Zur et al.
2008/0043632 A1* 2/2008 Tripathi et al. .............. 370/251
2008/0043755 A1* 2/2008 Nordmark et al. ........... 370/397

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

* cited by examiner

ASSIGNING HIGHER PRIORITY TO TRANSACTIONS BASED ON SUBSCRIPTION LEVEL

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" Ser. No. 11/112,367 "Method and Apparatus for Consolidating Available Computing Resources on Different Computing Devices" Ser. No. 11/112,368; "Method and Apparatus for Dynamically Isolating Affected Services Under Denial of Service Attack" Ser. No. 11/112,158 "Method and Apparatus for Improving User Experience for Legitimate Traffic of a Service Impacted by Denial of Service Attack" Ser. No. 11/112,629; "Method and Apparatus for Limiting Denial of Service Attack by Limiting Traffic for Hosts" Ser. No. 11/112,328; "Hardware-Based Network Interface Per-Ring Resource Accounting" Ser. No. 11/112,222; "Dynamic Hardware Classification Engine Updating for a Network Interface" Ser. No. 11/112,934; "Network Interface Card Resource Mapping to Virtual Network Interface Cards" Ser. No. 11/112,436; "Network Interface Decryption and Classification Technique" Ser. No. 11/112,436; "Method and Apparatus for Enforcing Resource Utilization of a Container" Ser. No. 11/112,910; "Method and Apparatus for Enforcing Packet Destination Specific Priority Using Threads" Ser. No. 11/112,584; "Method and Apparatus for Processing Network Traffic Associated with Specific Protocols" Ser. No. 11/112,228; and "Method and Apparatus for Enforcing Bandwidth Utilization of a Virtual Serialization Queue" Ser. No. 11/112,322.

BACKGROUND

Computing systems range from simple systems having one or two central processing units (CPU's) to complex systems having many nodes, each node having up to forty or more CPU's.

It is common for computing systems to have time periods when computing resources (e.g., processor time, network bandwidth, etc.), which are not used for processing computing jobs, are available. The number and quantity of available resources often depends on the size of the computing system involved. Larger computing systems with more overall capability and available resources than smaller systems may have a large amount of resources available during certain time periods.

Further, some computing systems may have unused computing resources at a time when another computing system may have more computing jobs than can possibly be handled by that system. To maximize utilization of resources, operators of computing systems with unused resources offer those resources to external computing systems. External systems using those resources send packets of data to the offering computing system, and those packets are processed in due course with all other packets arriving from other sources, without regard for the source or purpose of the packet.

SUMMARY

In general, in one aspect, the invention relates to a method for managing computing resources that includes creating a plurality of virtual network stacks on a first computing system and receiving a first packet of a plurality of packets on the first computing system over a first connection established between the first computing system and a second computing system associated with a first business entity. A first virtual network stack of the plurality of virtual network stacks associated with a packet destination is assigned to the first business entity based on the first connection. The method includes determining that the first packet originates from the second computing system, and reconfiguring, responsive to determining that the first packet originates from the second computing system, the virtual network stacks associated with the first computing system to process subsequent packets of the plurality of packets received over the first connection at the first priority.

In general, in one aspect, the invention relates to computing system that includes a plurality of virtual network stacks on a first computing system, wherein a first virtual network stack of the plurality of virtual network stacks is assigned to a first business entity having a first subscription level and is associated with a first priority, and wherein a second virtual network stack is associated with a second priority. Further, a network interface card on the first computing system is coupled to the plurality of virtual network stacks for receiving a plurality of packets over a first connection established with a second computing system, the network interface card being initially configured to route the plurality of packets received over the first connection to the second virtual network stack.

In general, in one aspect, the invention relates to a computing process on the computing system that processes a first packet of the plurality of packets from the network interface card to the second virtual network stack according to a second priority associated with newly established connections, and determines that the first packet is associated with the first business entity and the first subscription level having the first priority. The computing process, responsive to determining that the first packet is associated with the first business entity, reconfigures the network interface card to route packets of the plurality of packets received over the first connection to the first virtual network stack.

Other aspects of the invention will be apparent from the following description and the appended claims.

DETAILED DESCRIPTION

Exemplary embodiments of the invention will be described with reference to the accompanying drawings. Like items in the drawings are shown with the same reference numbers.

In one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In this specification, it is intended that the term "coupled" describe hardware and software devices and processes which interact with each other, directly or indirectly. For example, first and second hardware devices that interact with each other through a transmission line between the two devices are directly coupled. Further, first and second devices that have intermediate devices disposed between them, and interact with one another through those intermediate devices, are indirectly coupled. In both situations, the first and second devices are considered coupled.

In general, in one or more embodiments of the invention relate to a method and apparatus for processing packets at different priorities. More particularly, packets are received over connections from multiple remote computers associated with business entities. Those business entities have subscription levels entitling them to various levels of service. As a first packet arrives over a given connection, the first packet may not be identified as being associated with a business entity having a subscription level. Once that first packet is processed through to a desired packet destination, the packet destination associates the connection (and therefore future packets arriving over that connection) with a subscription level. A classifier within the network interface card is then reconfigured to route future packets arriving over that connection to a virtual network stack having a priority corresponding to the subscription level. Packets are requested from that virtual network stack according to the corresponding priority, and are operated on by the associated packet destination.

Figure 1:
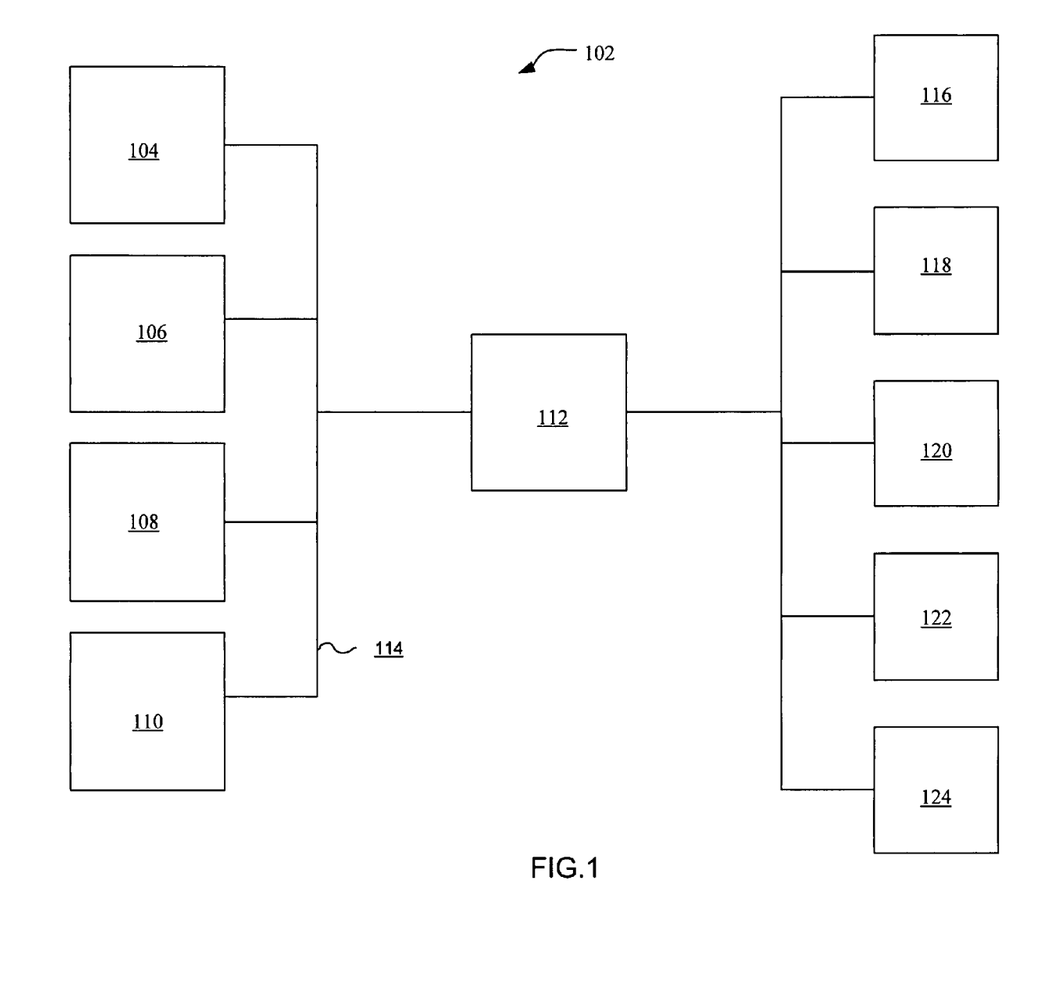
FIG. 1 shows a block diagram of a system according to one or more embodiments of the invention.

FIG. 1 shows a block diagram of a system according to one or more embodiments of the invention.

Network (102) includes local computing systems (104, 106, 108, and 110) which periodically have unused resource capacity. Local computing systems (104, 106, 108, and 110) are coupled to each other and to an intermediate system (112) through transmission lines (114). Also coupled to the intermediate system (112) are remote computing systems (116, 118, 120, 122, and 124).

Persons of ordinary skill in the art having the benefit of this disclosure will readily recognize that systems described as "coupled" above may have intermediate devices disposed between them but still interact and communicate with each other.

The terms "local" and "remote" as used above are used only to provide specificity to a particular device or set of devices (such as remote computing systems 116, 118, 120, 122, and 124) being discussed. Thus, those terms are not meant to describe the character of the coupling between or the proximity of the referenced devices.

For example, when discussing first and second computing systems coupled together, through a direct connection of a transmission line with no other devices disposed between them, or alternatively coupled together through intermediate devices, the first computing system may be labeled as remote while the second computing system is labeled as local. However, the labels "local" and "remote" could just as easily be applied to the second computing system and the first computing system respectively.

Referring again to FIG. 1, assume one or more local computing systems (104, 106, 108, and 110) have, at times, unused resource capacity. Further, assume that one or more remote computing systems (116, 118, 120, 122, and 124), from time to time, have jobs which cannot be executed due to the lack of resources on those remote computing systems.

The invention described herein may be employed to allow one or more remote computing systems (116, 118, 120, 122, and 124) to use the unused respective resource capacities of the local computing systems (104, 106, 108, and 110) or of the intermediate computing system (112). If desirable, the various local computing systems (104, 106, 108, and 110) and the intermediate computing system (112) may account for such usage, for billing purposes or for other reasons. The intermediate computing system (112) may also account for the usage of the various resources by various ones of the remote computing systems (116, 118, 120, 122, and 124), for billing or other purposes.

In one or more embodiments of the invention, owners or operators of the intermediate computing system (112) make arrangements with the respective owners or operators of the local computing systems (104, 106, 108, and 110) to use excess or unused resource capacity of those systems. The owners or operators of the intermediate system (112) may make arrangements with the owner or operators of the remote computing systems (116, 118, 120, 122, and 124) who need the excess or unused resource capacity from time to time.

In addition to making unused resource capacity available, a local computing system (104, 106, 108, and 110) may wish to control the bandwidth provided to various ones of either the intermediate computing system (112) or the remote computing systems (116, 118, 120, 122, or 124).

This bandwidth control is done by examining network traffic, typically in the form of packets, classifying those packets using information contained in those packets, and acting on those classified packets according to the level of importance placed on the packet, as determined during the classifying process. The first packet arriving over a given connection may not be identified as being associated with a business entity having a subscription level. However, once that first packet is processed through to a desired packet destination (e.g. container, zone, or other computing process), the packet destination associates the connection (and therefore future packets arriving over that connection) with a subscription level. A classifier is then reconfigured to route future packets arriving over that connection to a virtual network stack having a priority corresponding to the subscription level. Packets are requested from that virtual network stack according to the corresponding priority, and are operated on by the associated packet destination.

Within a local computing system (104, 106, 108, and 110) is a packet processing system used for receiving packets and for processing packets according to the level of importance, or priority associated with the packets.

Figure 2:
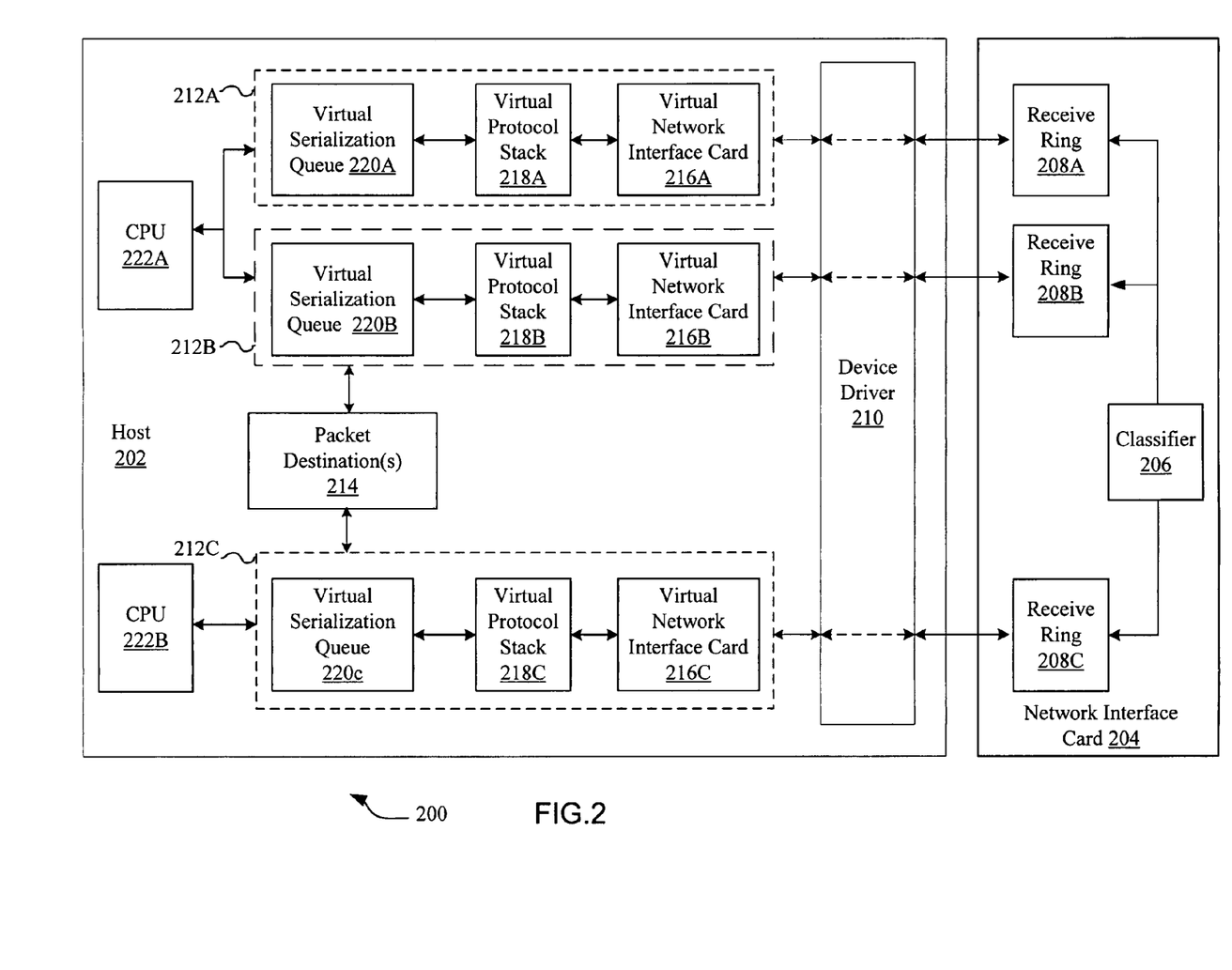
FIG. 2 shows a system in accordance with one or more embodiments of the invention.

FIG. 2 shows a system in accordance with one or more embodiments of the invention. Computing system (200) includes a host (202) operatively connected to a network interface card (NIC) (204). The NIC (204) provides an interface between the host (202) and a network (not shown) (e.g., a local area network, a wide area network, a wireless network, etc.). More specifically, the NIC (204) includes a network interface (i.e., the hardware used to interface with the network).

Packets received at the network interface are forwarded to other components on the NIC (204) for processing. In one or more embodiments of the invention, the NIC (204) includes a classifier (206) and one or more receive rings (e.g., 208A, 208B, 208C). In one or more embodiments of the invention, the receive rings (208A, 208B, 208C) correspond to portions of memory within the NIC (204) used to temporarily store the received packets. Further, in one or more embodiments of the invention, a ring element of the receive rings (208A, 208B, 208C) points to host memory. In one or more embodiments of the invention, the classifier (206) is configured to analyze the incoming network traffic, typically in the form of packets, received from the network (not shown), in order to ultimately determine which virtual network stack should receive each packet. The NIC (204) is coupled through a device driver (210) to virtual network stacks, such as virtual network stacks 212A, 212B, and 212C.

This determination is made based on a number of factors, some of which may be system specific. In one or more embodiments of the invention, initial packets received over a connection from a remote computing system to a local computing system are routed by the classifier to a general virtual network stack used for general computing processes. In one or more embodiments of the invention, once those packets have been processed, a computing process or packet destination reconfigures the classifier to route future packets arriving over the same connection into a virtual network card having a different priority than the virtual network stack used for general computing processes.

In one or more embodiments of the invention, the determination as to which virtual network stack (e.g., 212A, 212B, or 212C) should receive a given packet is based on the connection used to transmit the packet into the system (200).

In one or more embodiments of the invention, analyzing packets includes analyzing information within the packets or associated with the packets (e.g., connection information, connection attributes, etc.) to make the determination.

The classifier (206) may be implemented entirely in hardware (i.e., the classifier (206) may be a separate microprocessor embedded on the NIC (204)). Alternatively, the classifier (206) may be implemented in software stored in memory (e.g., firmware, etc.) on the NIC (204) or within the host (202) and executed by a microprocessor on the NIC (204) or within the host (202).

Once the classifier (206) has analyzed and classified a given packet, that packet is sent to the appropriate receive ring (e.g., one of receive rings 208A, 208B, 208C), which hold packets awaiting processing that share at least one common characteristic.

In one or more embodiments of the invention, the device driver (210) provides an interface between the receive rings (208A, 208B, 208C) and the host (202). The virtual network stacks (212A, 212B, 212C) provide an abstraction layer between the NIC (204) and the various packet destination(s) (214) (e.g., container(s) and/or service(s)) executing on the host (202).

In one or more embodiments of the invention, a virtual network stack (e.g., 212A, 212B, 212C) includes a virtual network interface card (VNIC) (216A, 216B, 216C), a virtual protocol stack (e.g., 218A, 218B, 218C) and a virtual serialization queue (e.g., 220A, 220B, 220C).

More specifically, each VNIC (216A, 216B, 216C) operates like a physical NIC (204). For example, in one or more embodiments of the invention, each VNIC (216A, 216B, 216C) is associated with an Internet Protocol (IP) address and one or more ports, and is configured to handle one or more protocol types. Thus, while the host (202) may be operatively connected to a single NIC (204), packet destination(s) (214) executing on the host (202) operate as if the host (202) includes multiple NICs. In one or more embodiments of the invention, the receive rings (208A, 208B, 208C) and queues (i.e., buffers) associated with the virtual NIC (216A, 216B, 216C) may be generally referred to as temporary data structures.

Each of the VNICs (216A, 216B, 216C) is operatively connected to a corresponding virtual protocol stack (218A, 218B, 218C). In one or more embodiments of the invention, each virtual protocol stack (218A, 218B, and 218C) includes functionality to process packets in accordance with various protocols used to send and receive packets (e.g., Transmission Communication Protocol (TCP), Universal Datagram Protocol (UDP), IP, etc.). Higher level protocols supported by other network layers include Hypertext Transport Protocol (HTTP) and Secure Hypertext Transport Protocol (HTTPS). Further, each virtual protocol stack (218A, 218B, 218C) also includes functionality, as needed, to perform additional processing on the incoming and outgoing packets. This additional processing may include, but is not limited to, cryptographic processing, firewall routing, etc.

In one or more embodiments of the invention, each virtual protocol stack (218A, 218B, 218C) includes network layer and transport layer functionality. In one or more embodiments of the present invention, network layer functionality corresponds to functionality to manage packet addressing and delivery on a network (e.g., functionality to support IP, Address Resolution Protocol (ARP), Internet Control Message Protocol, etc.). In one or more embodiments of the invention, transport layer functionality corresponds to functionality to manage the transfer of packets on the network and functionality to ensure that received packets are identical to transmitted packets (e.g., functionality to support TCP, User Datagram Protocol (UDP), Stream Control Transmission Protocol (SCTP), etc.).

In one or more embodiments of the invention, each virtual protocol stack (218A, 218B, 218C) is associated with a particular virtual serialization queue (220A, 220B, 220C).

In one or more embodiments of the invention, each virtual serialization queue (220A, 220B, 220C) includes a data structure having at least two queues, an inbound queue and an outbound queue. Each of the queues within the virtual serialization queues (220A, 220B, 220C) are typically implemented as first-in first-out (FIFO) queues. Further, in one or more embodiments of the invention, each virtual serialization queue (220A, 220B, 220C) is configured to send and receive packets from an associated VNIC (216A, 216B, 216C) via an associated virtual protocol stack (218A, 218B, 218C). In addition, each virtual serialization queue (220A, 220B, 220C) is configured to send packets to and receive packets from one or more associated packet destination(s) (214) (e.g., containers and/or services).

The host (202) may include one or more CPUs (222A, 222B). Further, each virtual serialization queue (220A, 220B, 220C) is bound to one of the CPUs (222A, 222B). Thus, more than one virtual serialization queue (220A, 220B, 220C) may be bound to a given CPU. Further, in some instances, more than one CPU may service a given virtual serialization queue (e.g., 220A, 220B, 220C).

As discussed above, the host (202) includes one or more packet destinations (214) (e.g., containers and/or services). In one or more embodiments of the invention, the packet destinations (214) (e.g., containers and/or services) correspond to a process or group of processes executing on the host that sends and receives network traffic. Examples of packet destinations (214) include, but are not limited to, containers, zones, web server, etc.

Figure 3:
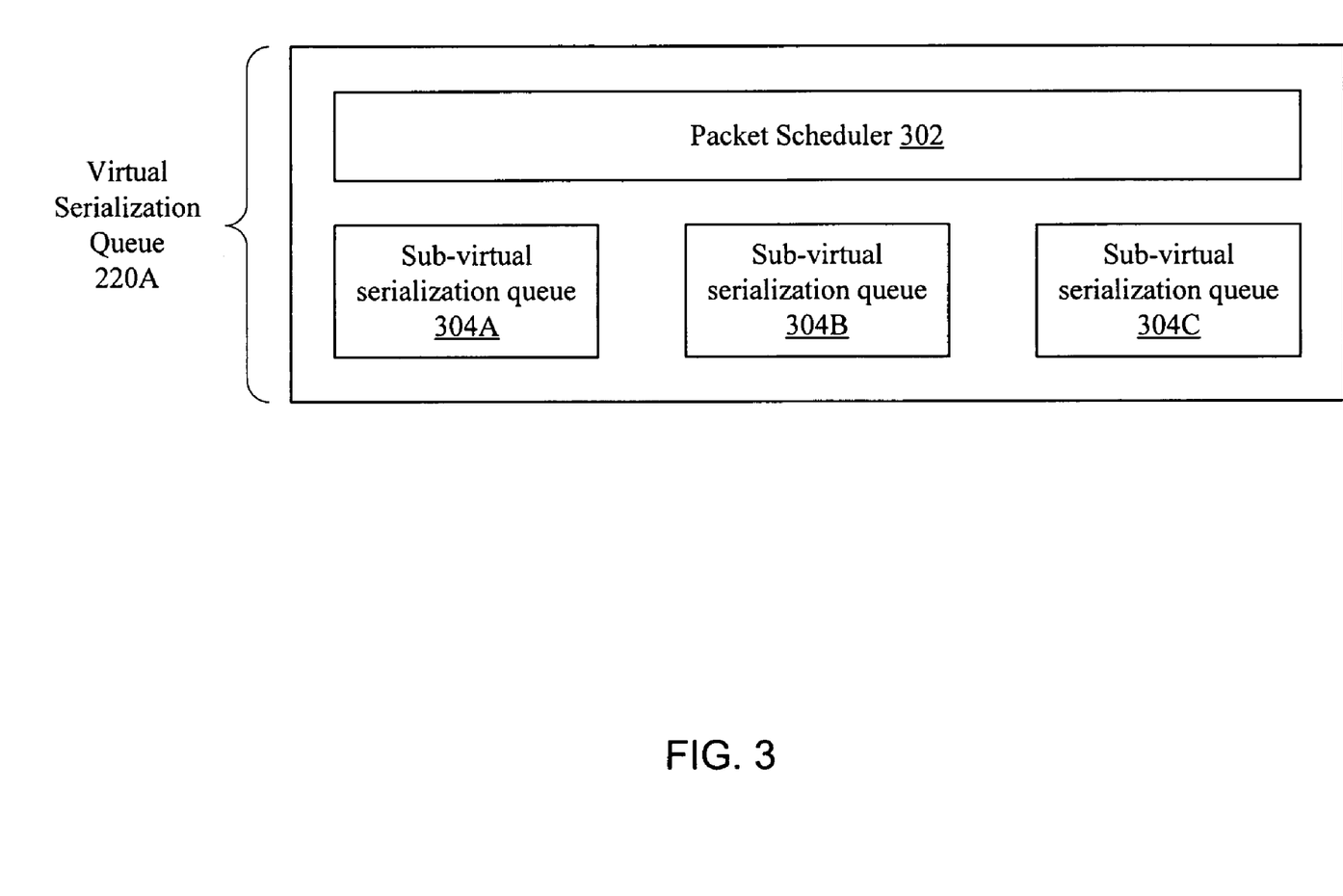
FIG. 3 shows a virtual serialization queue in accordance with one or more embodiments of the invention.

FIG. 3 shows a virtual serialization queue in accordance with one or more embodiments of the invention. In one or more embodiments of the present invention, a virtual serialization queue (for example, virtual serialization queue 220A of FIG. 2) includes a packet scheduler (302) and one or more sub-virtual serialization queues (304A, 304B, 304C).

In one or more embodiments of the invention, each sub-virtual serialization queue (304A, 304B, 304C) may be configured to queue specific types of packets. For example, the sub-virtual serialization queues (304A, 304B, 304C) may be configured to queue received packets based on the protocol (e.g., IP Security Protocol (IPsec), TCP, IP, UDP, etc.) used to send the packet.

Persons having ordinary skill in the art having the benefit of this disclosure will appreciate that each sub-virtual serialization queue (304A, 304B, 304C) may be configured to queue any distinct subset of packets. In one or more embodiments of the invention, each sub-virtual serialization queue (304A, 304B, 304C), is bound to the same CPU (i.e. 222A of FIG. 2) and associated with the same virtual network stack (i.e., 212A of FIG. 2) as the corresponding virtual serialization queue (220A).

Further, if the virtual serialization queue (220A) includes one or more sub-virtual serialization queues (304A, 304B, 304C), the associated virtual network stack (i.e., 212A of FIG. 2) is bound to a corresponding number of receive rings (receive rings not shown). Thus, when the virtual serialization queue (220A) receives packets from one or more receive rings, the packets are routed to the appropriate sub-virtual serialization queue (304A, 304B, 304C) based on which receive ring previously held those packets. In one or more embodiments of the invention, each of the sub-virtual serialization queues (304A, 304B, 304C) includes a pair of FIFO queues, namely an inbound queue and an outbound queue.

Persons of ordinary skill in the art having the benefit of this disclosure will appreciate that a virtual serialization queue (220A) does not necessarily include any sub-virtual serialization queues (304A, 304B, 304C), in which case the virtual serialization queue (220A) need only include a pair of queues, one for inbound packets and one for outbound packets.

In one or more embodiments of the invention, the packet scheduler (302) is configured to process the packets stored in each of the associated sub-virtual serialization queues (304A, 304B, 304C). More specifically, the packet scheduler (302) schedules when packets queued in the various sub-virtual serialization queues (304A, 304B, 304C) are to be processed (i.e., the order of processing of those packets, etc.).

In one or more embodiments of the invention, the packet scheduler (302) includes functionality to support fair-share scheduling of packets queued on the sub-virtual serialization queues (304A, 304B, 304C). Further, the packet scheduler (302) may be configured to schedule packet processing based on individual priorities associated with ones of the sub-virtual serialization queues (304A, 304B, 304C).

Combining the teachings of FIGS. 1 through 3, a distributed system may be obtained by the owners or operators of computing systems establishing virtual network stacks (such as VNS's 212A, 212B, and 212C) on their respective computing systems, and offering services associated with those virtual network stacks to owners and operators of remote systems (such as remote systems 116, 118, 120, 122, and 124 of FIG. 1). Although overall control of the processes and priorities on local systems (104, 106, 108, and 110) resides with the owners and operators of those systems, control of the application deployment within a given packet destination and the computing environment within the virtual network stack is provided to the user of the associated resources.

Figure 4:
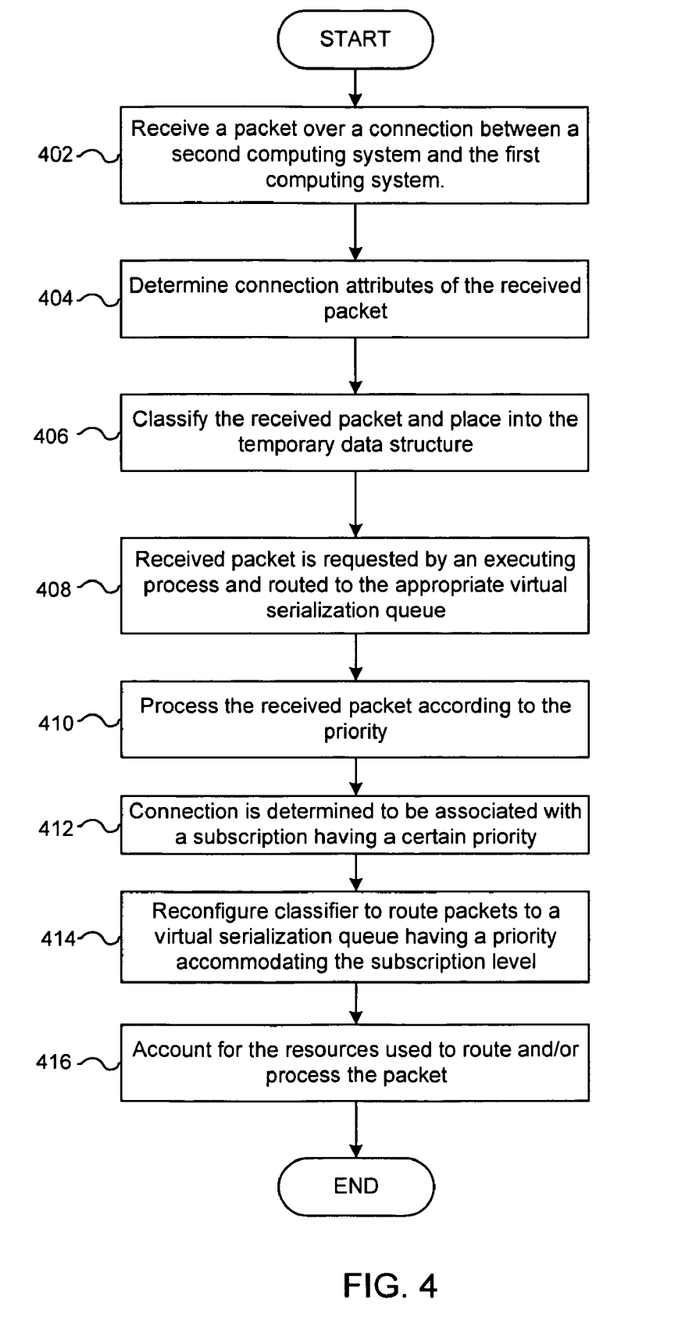
FIG. 4 shows a flowchart of a method according to one or more embodiments of the invention.

FIG. 4 is a flowchart showing a method according to one or more embodiments of the invention. Referring to FIG. 4, a connection is established between a first computing system (e.g. remote computing system 116) and a second computing system (such as any of the local computing systems 104, 106, 108, and 110), at (402). Initially, the classifier (206) is configured to forward packets received from newly established connections to a particular receive ring and virtual network stack associated having a moderate priority setting. At (402), a first packet is also received from the first computing system (116).

Persons of ordinary skill in the art having the benefit of this disclosure are readily aware that packets may be received by a computing system using a wide variety of protocols, some of which use connections (such as TCP/IP), others of which are connectionless (such as UDP).

At (404), attributes associated with the received packet are determined. In one or more embodiments of the invention, determination of the attributes of the received packet is accomplished by examining the packet itself (e.g., the packet header, the payload, etc.). In one or more embodiments of the invention, such attributes may include the internet protocol (IP) address of the sending computing system, the port over which the packet was received, the protocol used to transmit the packet, etc. Other attributes will be known to persons of ordinary skill in the art having the benefit of this disclosure. It is expected that one or more attributes associated with the received packet will be unique to one or more virtual serialization queues (such as 220A, 220B, 220C of FIG. 2) in the system.

At (406), the received packet is classified according to the one or more attributes determined at (404). In system (200) of FIG. 2, the different virtual serialization queues (such as 218A, 218B, and 218C of FIG. 2) within the virtual network stack may be associated with different system priorities. Initially, the classifier (206) is configured to forward packets received from newly established connections to a particular receive ring and virtual network stack associated having a moderate priority setting.

Because received packets having similar characteristics are routed to the same virtual serialization queue (such as virtual serialization queue 218A of FIG. 2), the system operate on each of the packets according to the level of importance associated with each different virtual serialization queue containing those similar packets. In one or more embodiments of the invention, the classified packet is then placed into a temporary data structure associated with the appropriate virtual network stack (e.g., the virtual network stack associated with the IP address of a particular secondary computer). Further, in one or more embodiments of the invention, the initial virtual network stack is given a low priority in terms of network bandwidth and CPU resources consumed.

At (408), the received packet is requested by an executing process and routed to the proper virtual serialization queue (such as 220B of FIG. 2) based on the classification of the packet performed at (406). Specifically, in one or more embodiments of the invention, the received packet is pulled from the temporary data structure and routed to the virtual network stack. In particular the packet is routed from the temporary data structure to a virtual network interface card, responsive to the classifying of the packet performed at (406). Next, the packet is routed to a virtual protocol stack associated with the virtual network interface card, and then routed to a virtual serialization queue associated with the virtual protocol stack.

In one or more embodiments of the invention, because the virtual network stack associated with the received packet is given the lowest priority, the received packet may remain on the temporary data structure until the virtual network stack(s) (and particularly the virtual serialization queue(s)) with a higher priority have been serviced.

At (410), the packets in a given virtual serialization queue (such as 220B of FIG. 2) are processed once the priority assigned to the virtual serialization queue (such as 220B of FIG. 2) is sufficiently high as compared to the availability of resources and the priority of the virtual serialization queue(s) associated with the first computing system.

At (412), a computing process within the receiving computing system (104) determines that one or more of the first packets received from the first computing system (such as remote computing 116) are associated with a connection from a business entity having a particular subscription level. That subscription level is associated with certain priority requirements that are different than the priority associated with the virtual serialization queue initially used for storing the packets prior to those packets being routed to a packet destination.

At (414) the classifier (206) is reconfigured to route packets associated with the connection to a receive ring and virtual serialization queue having a priority accommodating the subscription level associated with the connection. This priority may either be higher or lower than the priority associated with the virtual serialization queue initially used for storing the packets prior to those packets being routed to a packet destination.

One business entity may have more than one subscription level, or different priorities, depending on connection attributes. For example, a business entity may wish for all file transfer protocol (FTP) requests be given a low priority, but desire that all HTTPS requests be given a higher priority. In this example where packets are classified by protocol, when a packet arrives over a connection associated with this business entity and that packet is classified, the packets having one protocol will be sent to a different receive ring (and therefore a different virtual serialization queue) than the packets having a different protocol (and therefore a different priority).

At (416) an accounting is made of the resources utilized in routing and/or processing the packet. Using the present invention, a packet transmitted by a remote computing system (such as remote computing system 116) may pass through intermediate computing system (112) before being finally processed by a local computing system such as local computing system (104)). Having established a virtual stack within computing system (104) through which packets must pass in order to be acted upon by a corresponding CPU, computing system (104) is able to track and have a detailed understanding of how much bandwidth and other resources were used by a given connection. Thus, computing system (104) will be able to account for all resources used by system (112), and the connections associated with the expenditures of those resources.

Correspondingly, since intermediate computing system (112) knows which incoming connections (from remote computing systems 116, 118, 120, 122 and 124) are associated with the use of resources at local computing systems (104, 106, 108, and 110), invoices may be prepared, if desired, so that the owners and operators of remote computing systems (116, 118, 120, 122 and 124) may pay according to their respective resource usage.

Persons of ordinary skill in the art having the benefit of this disclosure will understand the ability to vary the amount and type of resources allocated to a given network stack, and therefore to a user, based on the load on the computing system. In one or more embodiments of the invention, hard limits and soft limits are established to ensure that some work is done for each user (and thus each virtual network stack) even when the computing system has a very high load on it. These limits also allocate additional resources to the resource user at times when the number of other computing jobs has diminished.

Persons of ordinary skill in the art having the benefit of this disclosure will appreciate that software instructions to perform embodiments of the invention may be stored on a computer readable medium such as a flash memory, a compact disc (CD), DVD, a diskette, a tape, a file, or any other computer readable storage device.

While the invention has been described with respect to a limited number of embodiments, those skilled in the art having benefit of this disclosure will appreciate that other embodiments can be devised which do not depart from the scope of the invention as disclosed herein. Accordingly, the scope of the invention should be limited only by the attached claims.

What is claimed is:

1. A method for managing computing resources comprising:
    creating a plurality of virtual network stacks on a first computing system, wherein a first virtual network stack of the plurality of virtual network stacks is associated with a first priority, wherein a second virtual network stack of the plurality of virtual network stacks is associated with a second priority, wherein the first computing system comprises a physical network interface, and wherein each of the plurality of virtual network stacks comprises:
        a virtual network interface card coupled to the physical network interface;
        a virtual protocol stack coupled to the virtual network interface card; and
        a virtual serialization queue coupled to the virtual protocol stack;
    receiving a first packet of a plurality of packets at the physical network interface on the first computing system over a first connection established between the first computing system and a second computing system associated with a first business entity, wherein the first business entity is associated with a first subscription level, and wherein the first subscription level is associated with the first priority;
    sending the first packet from the physical network interface to the second virtual network stack;
    determining that the first packet originates from the second computing system; and
    reconfiguring, responsive to determining that the first packet originates from the second computing system, the physical network interface to send other packets of the plurality of packets received over the first connection to the first virtual network stack.

2. The method of claim 1 further comprising:
    processing the first packet according to the second priority.

3. The method of claim 1, wherein sending the first packet from the physical network interface to the second virtual network stack comprises:
    sending the first packet from the physical network interface into a temporary data structure associated with the physical network interface; and
    sending, based on the second priority, the first packet from the temporary data structure to the second virtual network stack.

4. The method of claim 1 wherein receiving a first packet from the second computing system comprises classifying the first packet based on information in the first packet.

5. The method of claim 4 wherein classifying the first packet comprises:
    selecting the first packet to classify according to an arrival time of the first packet at a classifier;
    determining that the first packet was received over the first connection; and
    identifying a set of attributes of the first connection that is uniquely associated with the virtual network interface card in the second virtual network stack.

6. The method of claim 5 wherein the set of attributes comprises at least one selected from the group consisting of a connection port, an internet protocol address of the second computer system, and a connection protocol.

7. The method of claim 6 wherein the connection protocol comprises at least one selected from the group consisting of HTTP, HTTPS, FTP, UDP, ARP.

8. The method of claim 1 wherein each of the plurality of virtual network stacks is configured to account for resource usage on the first computing system.

9. The method of claim 1 further comprising:
receiving a second packet at the physical network interface over a second connection established between the first computing system and a third computing system;
determining, based on at least one attribute of the second packet, that the second connection is associated with a second business entity, wherein the second business entity is associated with a second subscription level, and wherein the second subscription level is associated with a third priority; and
reconfiguring, responsive to determining that the second connection is associated with a second business entity, the physical network interface to send future packets received over the second connection to a third virtual network stack associated with the third priority.

10. The method of claim 9 further comprising processing the second packet according to the third priority.

11. The method of claim 9 wherein the at least one attribute of the second packet is selected from the group consisting of a packet destination, a connection port, an internet protocol address of the third computer system, and a connection protocol.

12. A computing system comprising:
a plurality of virtual network stacks on a first computing system, wherein a first virtual network stack of the plurality of virtual network stacks is assigned to a first business entity having a first subscription level and is associated with a first priority, wherein a second virtual network stack is associated with a second priority, and wherein each virtual network stack comprises:
a virtual network interface card;
a virtual protocol stack coupled to the virtual network interface card; and
a virtual serialization queue coupled to the virtual protocol stack;
a network interface card on the first computing system coupled to the virtual network interface cards of the plurality of virtual network stacks for receiving a plurality of packets over a first connection established with a second computing system, wherein the network interface card is initially configured to send the plurality of packets received over the first connection to the second virtual network stack;
a computing process for processing a first packet of the plurality of packets from the network interface card to the second virtual network stack according to a second priority associated with newly established connections, and for determining that the first packet is associated with the first business entity and the first subscription level having the first priority, and for reconfiguring the network interface card to send packets of the plurality of packets received over the first connection to the first virtual network stack, responsive to that determination.

13. The system of claim 12 wherein the network interface card further comprises a classifier initially configured to:
select a packet from the plurality of packets to classify based on arrival time at the classifier, resulting in a selected packet;
determine that the selected packet was received over the first connection;
send the packet a temporary data structure, responsive to the determination that the selected packet was received over the first connection.

14. The system of claim 12 wherein at least one of the plurality of virtual network stacks is configured to account for packet throughput and to provide packet throughput information to the first computing system, wherein packet throughput information comprises at least one chosen from the group consisting of the number of packets per unit time, connection type, packet size, average packet size, and average number of packets processed per unit time.

15. A computer program product having disposed thereon machine readable instructions to execute a method comprising:
creating a plurality of virtual network stacks on a first computing system, wherein a first virtual network stack of the plurality of virtual network stacks is associated with a first priority, wherein a second virtual network stack of the plurality of virtual network stacks is associated with a second priority, wherein the first computing system comprises a physical network interface, and wherein each of the plurality of virtual network stacks comprises:
a virtual network interface card coupled to the physical network interface;
a virtual protocol stack coupled to the virtual network interface card; and
a virtual serialization queue coupled to the virtual protocol stack;
receiving a first packet at the physical network interface on the first computing system over a first connection established between the first computing system and a second computing system associated with a first business entity, wherein the first business entity is associated with a first subscription level, and wherein the first subscription level is associated with the first priority;
sending the first packet from the physical network interface to the second virtual network stack;
determining that the first packet originates from the second computing system; and
reconfiguring, responsive to determining that the first packet originates from the second computing system, the physical network interface to send future packets received over the first connection to the first virtual network stack.

16. The computer program product of claim 15 wherein the method further comprises processing the first packet according to the second priority.

17. The computer program product of claim 15, wherein sending the first packet from the physical network interface to the second virtual network stack comprises:
sending the first packet from the physical network interface into a temporary data structure associated with the physical network interface ; and
sending, based on the second priority, the first packet from the temporary data structure to the second virtual network stack.

18. The computer program product of claim 15 wherein receiving a first packet at the physical network interface comprises classifying the first packet based on information contained in the first packet.

19. The method of claim 3, wherein the temporary data structure corresponds to at least one of a plurality of receive rings included in the physical network interface.

20. The computer program product of claim 17, wherein the temporary data structure corresponds to at least one of a plurality of receive rings included in the physical network interface.

* * * * *

UNITED STATES PATENT AND TRADEMARK OFFICE
CERTIFICATE OF CORRECTION

PATENT NO.        : 7,591,011 B1                                   Page 1 of 1
APPLICATION NO.   : 11/112947
DATED             : September 15, 2009
INVENTOR(S)       : Droux et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1155 days.

Signed and Sealed this

Twenty-first Day of September, 2010

David J. Kappos
*Director of the United States Patent and Trademark Office*